United States Patent [19]
Bornstein et al.

[11] Patent Number: 5,661,592
[45] Date of Patent: Aug. 26, 1997

[54] METHOD OF MAKING AND AN APPARATUS FOR A FLAT DIFFRACTION GRATING LIGHT VALVE

[75] Inventors: Jonathan G. Bornstein, Cupertino; William C. Banyai, East Palo Alto; David M. Bloom, Portola Valley; Ralph G. Whitten, San Jose; Bryan P. Staker, Palo Alto, all of Calif.

[73] Assignee: Silicon Light Machines, Sunnyvale, Calif.

[21] Appl. No.: 480,459

[22] Filed: Jun. 7, 1995

[51] Int. Cl.$^6$ .................................................. G02B 26/00
[52] U.S. Cl. ........................... 359/291; 359/213; 257/415
[58] Field of Search ................................. 359/213, 226, 359/244, 572, 290, 291, 248; 257/415, 419, 42

[56] References Cited

U.S. PATENT DOCUMENTS

| | | | |
|---|---|---|---|
| 3,947,105 | 3/1976 | Smith | 353/121 |
| 4,009,939 | 3/1977 | Okano | 350/162 SF |
| 4,017,158 | 4/1977 | Booth | 350/162 SF |
| 4,067,129 | 1/1978 | Abramson et al. | 40/563 |
| 4,093,346 | 6/1978 | Nishino et al. | 350/162 SF |
| 4,139,257 | 2/1979 | Matsumoto | 350/6.1 |
| 4,163,570 | 8/1979 | Greenaway | 283/8 A |
| 4,184,700 | 1/1980 | Greenaway | 283/6 |
| 4,211,918 | 7/1980 | Nyfeler et al. | 235/454 |
| 4,223,050 | 9/1980 | Nyfeler et al. | 427/163 |
| 4,250,217 | 2/1981 | Greenaway | 428/161 |
| 4,250,393 | 2/1981 | Greenaway | 250/566 |
| 4,408,884 | 10/1983 | Kleinknecht et al. | 356/355 |
| 4,440,839 | 4/1984 | Mottier | 430/2 |
| 4,492,435 | 1/1985 | Banton et al. | 350/360 |
| 4,556,378 | 12/1985 | Nyfeler et al. | 425/143 |
| 4,596,992 | 6/1986 | Hornbeck | 346/76 PH |
| 4,655,539 | 4/1987 | Caulfield et al. | 350/3.6 |
| 4,751,509 | 6/1988 | Kubota et al. | 340/784 |

(List continued on next page.)

OTHER PUBLICATIONS

R. Apte, F. Sandejas, W. Banyai, D. Bloom, "Grating Light Valves For High Resolution Displays", Ginzton Laboratories, Stanford University, Stanford, CA 94305–4085.

R. Apte, *Grating Light Valves For High Resolution Displays* Jun., 1994.

O. Solgaard, *Integrated Semiconductor Light Modulators For Fiber–Optic And Display Applications*, Feb., 1992.

J. Neff, "Two–Dimensional Spatial Light Modulators: A Tutorial", *Proceedings of the IEEE*, vol. 78, No. 5 (May 1990), pp. 826–855.

Gerhard–Multhaupt, "Viscoelastic Spatial Light Modulators and Schlieren–Optical Systems for HDTV Projection Displays", *SPIE vol. 1255 Large Screen Projection Displays II* (1990), pp. 69–78.

Gerhard–Multhaupt, "Light–Valve Technologies for High–Definition Television Projection Displays", *Displays*, vol 12, No. 3/4 (1991), pp. 115–128.

*Primary Examiner*—Mark Hellner
*Attorney, Agent, or Firm*—Haverstock & Associates

[57] ABSTRACT

A deformable grating apparatus for modulating light is made by forming an insulating layer on a substrate, forming a first conductive layer on the insulating layer and then forming a sacrificial layer thereon. The sacrificial layer and the first conducting layer are then etched to define bit lines and busses to bonding pads. Then a layer of resilient material is formed onto the etched layers and a reflective conducting layer is formed on the resilient layer. A dielectric layer is deposited on the reflective conducting layer. The dielectric layer, the reflective conducting layer, the resilient layer and the sacrificial layer are all then etched to form a grating including a plurality of parallel elements. Thereafter the sacrificial layer is removed below the parallel elements, to suspend the parallel elements over the first conducting layer. The surface is treated to prevent the grating from adhering to the first conducting layer. A light modulator includes a substrate with an insulating layer, and a plurality of parallel conductive layers formed on the insulating layer. The ribbons are spaced apart from the conductive layers by an air space and mounted to the substrate in gaps between the conductive layers.

18 Claims, 10 Drawing Sheets

U.S. PATENT DOCUMENTS

| | | | |
|---|---|---|---|
| 4,761,253 | 8/1988 | Antes | 264/1.3 |
| 4,856,869 | 8/1989 | Sakata et al. | 350/162.18 |
| 4,915,463 | 4/1990 | Barbee, Jr. | 350/1.1 |
| 4,984,824 | 1/1991 | Antes et al. | 283/91 |
| 5,035,473 | 7/1991 | Kuwayama et al. | 350/3.7 |
| 5,058,992 | 10/1991 | Takahashi | 359/567 |
| 5,089,903 | 2/1992 | Kuwayama et al. | 359/15 |
| 5,101,184 | 3/1992 | Antes | 235/454 |
| 5,132,812 | 7/1992 | Takahashi et al. | 359/9 |
| 5,155,604 | 10/1992 | Miekka et al. | 359/2 |
| 5,231,388 | 7/1993 | Stoltz | 340/783 |
| 5,291,317 | 3/1994 | Newswanger | 359/15 |
| 5,301,062 | 4/1994 | Takahashi et al. | 359/567 |
| 5,311,360 | 5/1994 | Bloom et al. | 359/572 |
| 5,347,433 | 9/1994 | Sedlmayr | 362/32 |
| 5,363,220 | 11/1994 | Kuwayama et al. | 359/3 |
| 5,367,585 | 11/1994 | Ghezzo et al. | 385/23 |
| 5,459,610 | 10/1995 | Bloom et al. | 359/572 |
| 5,500,761 | 3/1996 | Goosen et al. | 359/290 |

METHOD OF MAKING AND AN APPARATUS FOR A FLAT DIFFRACTION GRATING LIGHT VALVE

FIELD OF THE INVENTION

This invention relates to the field of modulating a light beam. More particularly, this invention is for a substantially flat diffraction grating light valve and a manufacturing process therefor.

BACKGROUND OF THE INVENTION

Figure 1:
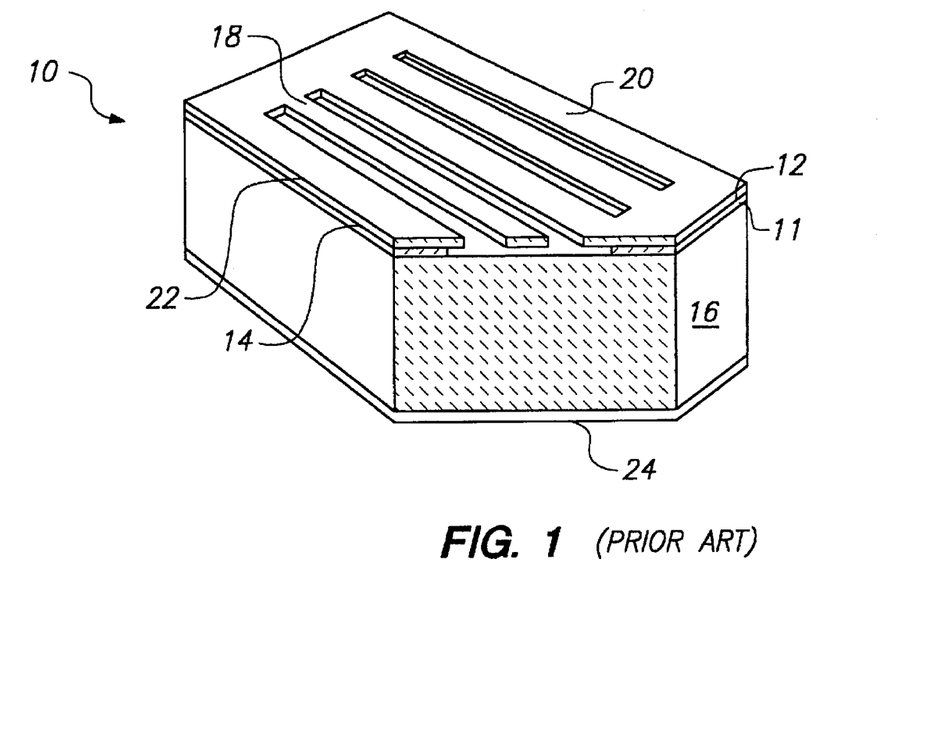
FIG. 1 is a sectional view of a modulator formed by the prior art method.

Many applications exist for devices which modulate a light beam, e.g. by altering the amplitude, frequency or phase of the light. An example of such a device is a reflective deformable grating light modulator 10 is shown in FIG. 1. The modulator 10 includes a plurality of equally spaced apart, deformable reflective ribbons 18 which are suspended above a reflective substrate 16. This modulator was proposed by Bloom et al., in U.S. Pat. No. 5,311,360 which is incorporated herein by reference. The ribbons 18 are held on a nitride frame 20 on an oxide spacer layer 12. For modulating light having a single wavelength $\lambda_0$, the modulator is designed such that the thickness of the ribbons and the thickness of the oxide spacer, both equal $\lambda_0/4$.

The grating amplitude of this modulator, defined as the perpendicular distance, d, between the reflective surface on the ribbons 18 layers and the reflective surfaces of the substrate 16, is controlled electronically. In its undeformed state, with no voltage applied between the ribbons 18 and the substrate 16, the grating amplitude equals $\lambda_0/2$ and the total path length difference between light reflected from the ribbons and the substrate equals $\lambda_0$, resulting in these reflections adding in phase and the modulator reflects light as a flat mirror. When an appropriate voltage is applied across the ribbons 18 and the substrate 16, an electrostatic force pulls the ribbons 18 down onto the surface of the substrate 16 and the grating amplitude is changed to equal $\lambda_0/4$. The total path length difference is one-half wavelength, resulting in the reflections from the surface of the deformed ribbons 18 and the reflections from the substrate 16 interfering destructively. As a result of this interference the modulator diffracts the light.

Grating light modulators of the type described in the Bloom et al., '360 patent can be used to create a structure for displaying images. A pixel can be formed of such a modulator with a minimum of one pair of adjacent grating elements. Where the display has an optical system which detects only the diffracted light, the pixel is dark or off when no voltage is applied to the ribbon and the ribbon remains in the up position, and the pixel is lighted or on when voltage is applied to the ribbon and the ribbon is pulled down onto the substrate. One very important criteria for designing display systems is the contrast ratio between a dark pixel and a lighted pixel. The best way to provide relatively large contrast ratio is to ensure that a dark pixel has no light.

A method for forming the modulator 10 is proposed in the Bloom et al., '360 patent. Referring to FIG. 1, an insulating layer 11 is deposited on a silicon substrate 16. This is followed by the deposition of a sacrificial silicon dioxide film 12 and a low-stress silicon nitride film 14, both 213 nm thick. Because these thicknesses determine the grating amplitude of the modulator, their dimensions are critical. Variations in these thicknesses will result in unwanted diffraction of light in the off state, thus lower contrast ratios.

The silicon nitride film 14 is then photolithographically patterned and etched into a grid of grating elements in the form of elongated elements 18. After this lithographic patterning process a peripheral silicon nitride frame 20 remains around the entire perimeter of the upper surface of the silicon substrate 16. Then the sacrificial silicon dioxide film 12 is etched in hydrofluoric acid. The silicon dioxide film 12 is completely removed by the acid etch thereby resulting in a plurality of silicon nitride ribbons, 213 nm thick, stretched within the frame and suspended a distance of 213 nm (this being the thickness of the etched away sacrificial film) above the silicon substrate 16.

As can be further seen the silicon dioxide layer 12 is not entirely etched below the frame 20. In this way, the frame 20 is supported, a distance of 213 nm, above the silicon substrate 16 by this remaining portion of the silicon dioxide 12 film. This requires a carefully controlled time-dependent etch to ensure that silicon dioxide layer 12 is left under the frame 20. Next, a 50 nm thick aluminum film is sputtered onto the ribbons 18 and the substrate 16. This aluminum film enhances the reflectivity of both the ribbons 18 and the substrate 16 and provides a first electrode for applying a voltage between the ribbons 18 and the substrate 16. A second electrode is formed by sputtering an aluminum film of similar thickness onto the base of the silicon substrate 16.

Adhesion between the ribbons 18 and the substrate 16 during the final wet processing step and during operation has been found to be a problem in these devices. The force causing this adhesion is a function of the contact area between the two surfaces and the adhesion specific-force (that is force per unit of contact area). Numerous techniques to reduce adhesion have been proposed, including: freeze-drying, dry etching of a photoresist-acetone sacrificial layer, OTS monolayer treatments, use of stiffer ribbons by using shorter ribbons and/or tenser nitride fills, roughening or corrugating one or both of the surfaces, forming inverted rails on the underneath of the ribbons, and changing the chemical nature of the surfaces. Sandejas et al. in "Surface Microfabrication of Deformable Grating Light Valves for High Resolution Displays" and Apte et al. in "Grating Light Valves for High Resolution Displays", Solid State Sensors and Actuators Workshop, Hilton Head Island, S.C. (June 1994), have demonstrated that such adhesion may be prevented by reducing the area of contact by forming inverted rails on the underneath of the bridges and by using rough polysilicon films, respectively. Currently, the preferred technique is to roughen one or both surfaces. However, because the substrate of the modulator 10 is used as an optical surface, the manufacturing processes for roughening the surfaces are complicated by the requirements that the reflecting portions of the substrate 16 be smooth with high reflectivity and be in a plane parallel to the ribbons 18, whereas the portions of the substrate under the ribbons 18 are rough.

Figure 2:
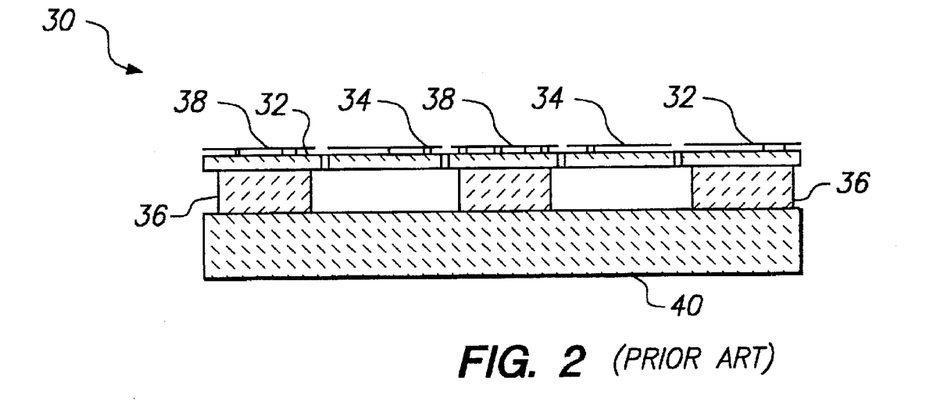
FIG. 2 is a sectional view of a modulator proposed in the prior art.

The Bloom et al., '360 patent proposes, but does not disclose a method of making, other embodiments of modulators which do not use the substrate as a reflecting surface. One type of modulator 30 is illustrated in FIG. 2 and includes fixed ribbons 38 alternately includes moveable ribbons 34. The fixed ribbons 38 are arranged to be coplanar with the moveable ribbons 34 and thereby present a substantially flat upper surface and the modulator reflects incident light as a flat mirror when no biasing voltage is applied. When a biasing voltage is applied the moveable ribbons 34 move downwards and the modulator diffracts the light. However, this device appears difficult to make, and its performance, like modulator 10 is very sensitive to the thicknesses of the ribbons and the oxide spacers under the fixed elements.

Furthermore, the contrast ratio and intensity of displays consisting of modulators 10 (FIG. 1) and 30 (FIG. 2) are also sensitive to inadvertent periodicity in the grating structure caused by processing. For example, swelling of the oxide spacers supporting the fixed ribbons, may occur during the processing of modulator 30. Such swelling would result in the fixed ribbons and the moveable ribbons not being coplanar in the off state, resulting in light being diffracted instead of reflected.

Furthermore, these modulators are subject to contrast ratio degradation due to effects of applied voltages and noise. In the first case, the presence of applied voltage to the substrate and to specific ribbons which are to be moved down will be felt by the other ribbons which are to remain up (pixel off) and these ribbons will bend and diffract some of the incident light so the pixel is partially on and lit instead of off and dark, resulting in a reduced contract ratio. Likewise the ribbons and not the fixed elements will bend in response to noise. This results in degradation of the contrast ratio due to a) variations in the grating amplitude (distance between the reflective surfaces of the adjacent grating elements) in modulator 10 and b) the ribbons and fixed elements no longer being coplanar in modular 30.

In summary, the performance of the modulators made using the prior art method suffer from, but not limited to, the following drawbacks: performance is very sensitive to process variations because the dimensions for the thickness of the ribbons, the sacrificial layer, and remaining oxide spacers define the grating amplitude; contrast ratio is optimized only for a single wavelength; the dark state and hence the contrast ratio is highly dependent on wavelength; the height of the ribbons over the substrate in the relaxed state cannot be adjusted after processing to tune for different wavelengths or to adjust for manufacturing variations; the preferred method for preventing sticking, roughening both surfaces, degrades the reflectivity of the substrate grating elements; and contrast ratio is degraded due to the effects of applied voltages and noise.

What is needed is a flat diffraction grating light valve which exhibits the following characteristics: the dark-state is independent of wavelength, the contrast ratio for white light operation is relatively high, the grating amplitude can be adjusted to optimize performance, self-biasing, common-mode rejection of noise, simple and cost-effective to manufacture, and tolerant of process variations.

Additionally, a method is needed of manufacturing such light valves and flat diffraction grating systems which exhibits the following characteristics: simple manufacturing process, high yields, self-limiting sacrificial layer etch, self-supporting modulator elements (no frame), and simplifies the process for obviating adhesion. Additionally, substrate manufacturing issues (roughness for reduction of adhesion and conductivity) are decoupled from optical issues (reflectivity and flatness).

SUMMARY OF THE INVENTION

A method of making a deformable grating apparatus for modulating light comprises the steps of forming an insulating layer on a substrate, forming a first conductive layer on an insulating layer and forming a sacrificial layer onto the first conducting layer. The sacrificial layer and the first conducting layer are then etched to define both bit lines and busses to bonding pads thereby forming etched layers. After the sacrificial layer and the first conducting layer are etched a layer of resilient material is formed onto the etched layers and a reflective conducting layer is formed on the resilient layer. A dielectric layer is deposited on the reflective conducting layer. The dielctric layer, the reflective conducting layer, the resilient layer and the sacrificial layer are all then etched to form a grating including a plurality of parallel elements. After this etching the sacrificial layer is removed below the parallel elements, thereby suspending the parallel elements over the first conducting layer. The grating is prevented from sticking to the first conducting layer when the grating is moved towards the first conducting layer by providing a treated surface between the grating and the first conducting layer.

A light modulator includes a substrate, an insulating layer on the substrate, a plurality of parallel conductive layers formed on th insulating layer such that adjacent ones of the conductive layers are separated by a gap and a plurality of continuous parallel reflective ribbons oriented substantially perpendicular to the conductive layers. In this manner the ribbons are spaced apart from the conductive layers by an air space and coupled to the substrate in the gaps between the conductive layers.

DETAILED DESCRIPTION OF THE PREFERRED EMBODIMENT

Figure 3:
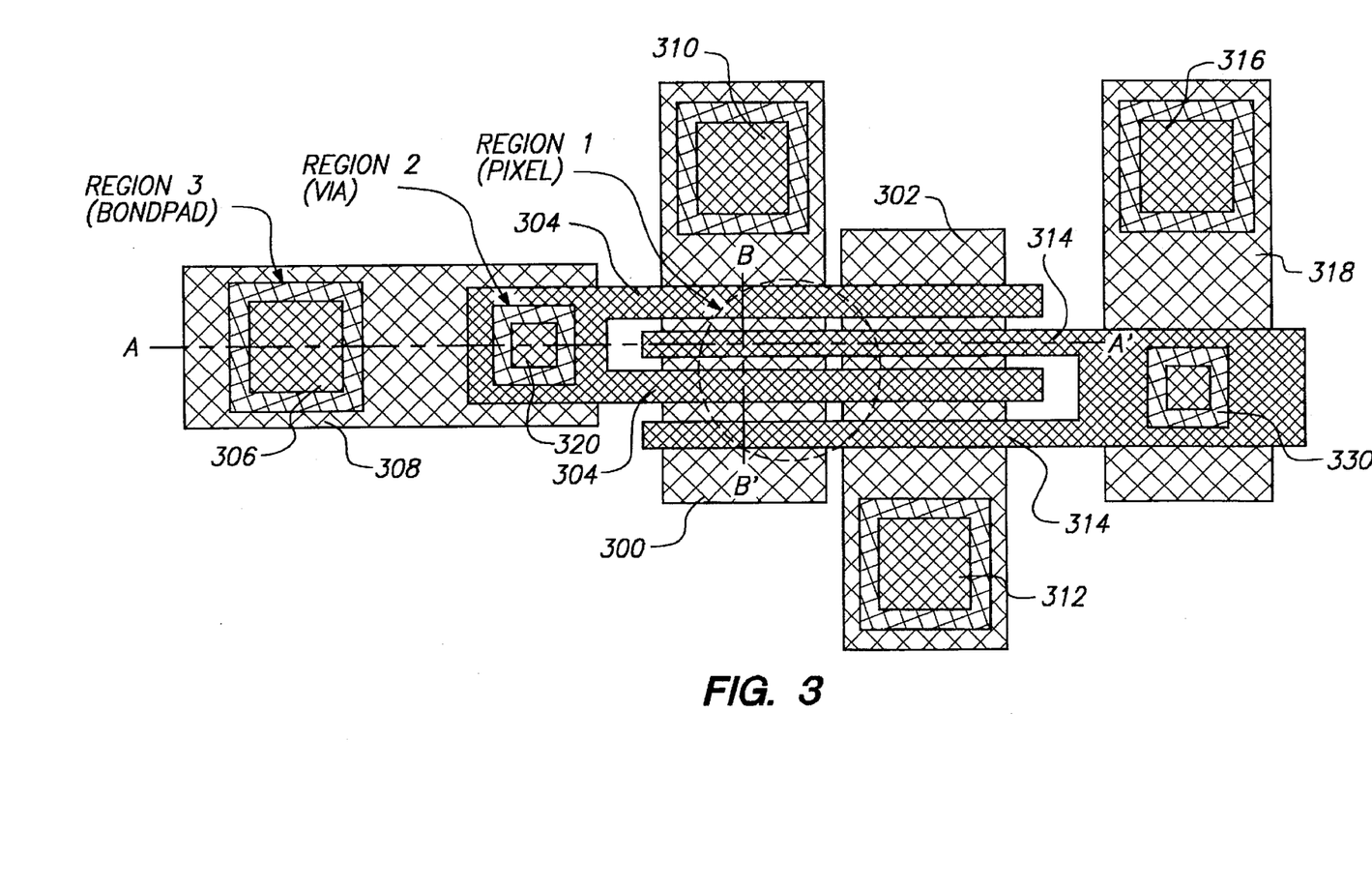
FIG. 3 through 26 are sectional views of a semiconductor wafer illustrating the process sequence of the present invention.

FIG. 3 shows a plan view of two pixel elements which are manufactured according to the method of the present invention. The plan view is representative of the preferred embodiment. It will be apparent to those having ordinary skill in the art that simple modifications can be made and still fall within the spirit of the present invention. For example, differing numbers of ribbons can be used for a pixel. Additionally, it will be understood that for many types of display devices, many pixels in many rows and columns can be used. In such systems, the bond pad regions can be substantially removed from the locus of the pixels.

A continuous conducting layer 300 underlies a plurality of ribbons. In the preferred embodiment, four ribbons over a single conducting layer comprise a single pixel. A second conducting layer 302 lies adjacent the first conducting layer 300 and defines a second pixel. In a conventional display device, the conducting layers are used to represent the columns of the display. Each of the conducting layers 300 and 302 are coupled to receive appropriate voltages from bond pads 306 and 312, respectively.

Each pixel includes four reflecting ribbons. Two of the ribbons 304 are electrically coupled together for receiving bias voltages. In the preferred embodiment, a bias voltage for the ribbons 304 is applied to a bond pad 306. The bond pad 306 is electrically coupled to a conductive layer 308 which is formed at the same time as the conducting layers 300 and 302 in the pixel region. The conducting layer 308 is electrically coupled to the ribbons 304 through a contact via 320. Another two of the ribbons 314 are electrically coupled together for receiving bias voltages. In the preferred embodiment, a bias voltage for the ribbons 314 is applied to a bond pad 316. The bond pad 316 is electrically coupled to a conductive layer 318 which is formed at the same time as the conducting layers 300 and 302 in the pixel region. The conducting layer 318 is electrically coupled to the ribbons 314 through a contact via 330.

One application embodying this invention, is a 2-dimensionally addressable grating light valve display which includes a reflective deformable grating light modulator, with a grating light modulator, with a grating amplitude that can be controlled electronically, consisting of a substrate with a deformable grating freely-suspending above it. The flat diffraction grating light valve structure and manufacturing method establish a means for making a flat diffraction grating having pixels that are dimensionally robust (self-supporting deformable ribbon formed by a self-limiting sacrificial layer etch), freely suspended over lower electrode lines without post-etch sticking (textured lower electrodes), and can be 2-dimensionally addressed by upper (word lines) and lower (bit lines) data lines.

The process of the present invention is shown step by step in FIGS. 4 through 26. These figures represent the cross-section of a wafer being processed pursuant to the present invention and are shown after each key step in the process. The location of the process is shown by the dotted lines A-A' and B-B' in FIG. 3. Identical elements are shown with the same numbers in sequential steps. A modified element, changed for example by etching, is shown by the same number with an alphabetic suffix. The method of fabricating grating light valve displays includes key processes and materials that are integrated by a unique architecture. Only the materials of the preferred embodiment as well as certain representative materials are disclosed herein and are not deemed to be in any way limiting.

Figure 4:
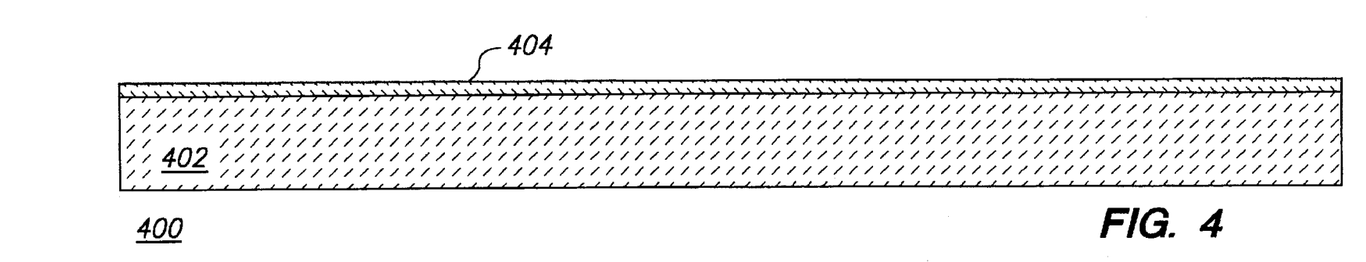

The first step, as illustrated in FIG. 4, is the formation of an insulating layer on a silicon substrate 400. In the preferred embodiment the insulating layer is a composite layer and is formed as follows: silicon wafers are thermally oxidized to form a field oxide layer 402. A thin layer of silicon nitride 404 is formed over the field oxide 402. The thickness requirement of the grown oxide is dictated by the effect of substrate capacitance and associated parasitics on pixel addressing. The nitride layer serves two functions: i) optimization of the interface to ribbon nitride in the gap between pixels; and ii) an etch stop to prevent undercutting of the ribbon in the spaces between pixels during the sacrificial layer etch.

Figure 5:
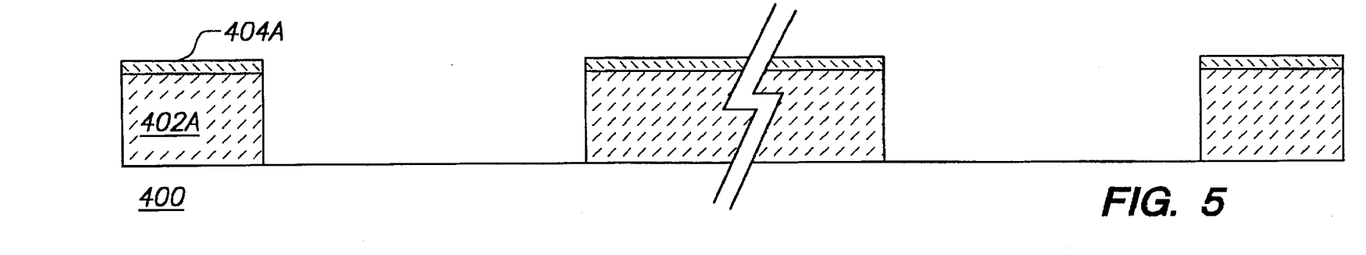

In portions of the periphery, the nitride layer 404 and field oxide layer 402 are patterned and etched to form the modified layers 402A and 404A, as shown in FIG. 5. However, these layers remain intact in the pixel region of the device and will continue to be called by their respective original reference numerals.

Figure 6:
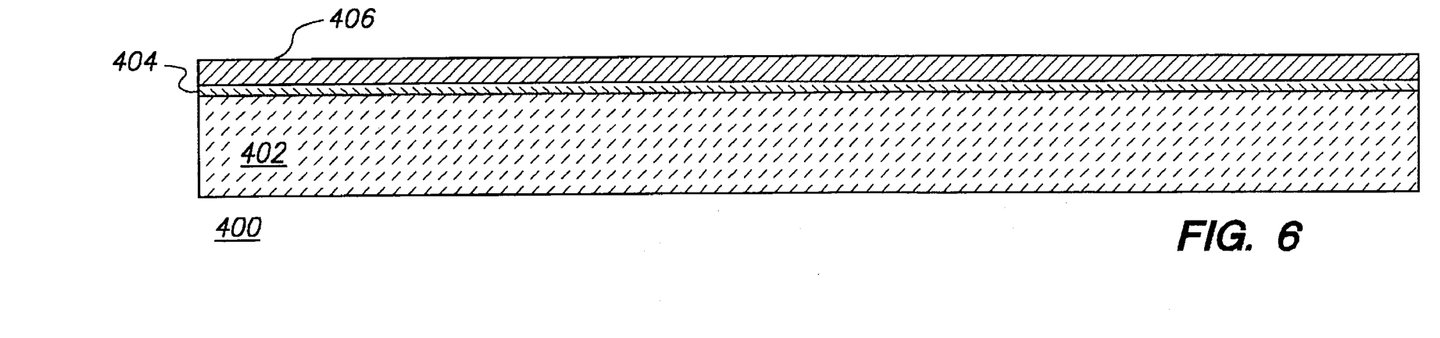

In the next step, which is illustrated in FIG. 6, a first conducting layer 406, typically a refractory metal, is formed over the nitride layer 404. This first conducting layer 406 serves as a lower electrode for the ribbon grating. It also serves as a bus layer that connects to the top electrode of the ribbon grating, through a via, to the bond pads which are external to the chip package. The first conducting layer 406 is positioned between the grating ribbons (not yet formed) and the substrate 400. The criteria for the conducting material are: i) high temperature compatibility (greater than or equal to 800 degrees C.); ii) low resistivity such that a sheet resistance of $\leq 1$ ohms/sq. can be achieved at a minimal thickness ($\leq 1000$ Å in order to preserve planarity); and iii) immunity to hydrogen fluoride-based wet etchants (the etchant for sacrificial layer etching). Refractory metals such as tungsten (W), molybdenum (Mo), and tantalum (Ta), as well as refractory mixtures like titanium-tungsten (up to 20 wt. % Ti) meet these requirements. In the preferred embodiment the metal is tungsten.

In order to obviate adhesion between the grating elements and this conductive layer, it is desirable to treat the top surface of the conducting layer 406 and/or the bottom surface of the ribbon layer. One method is to impart a surface texture or roughness to the conducting layer 406 by any of several means. In one case a dry etch of W in a plasma containing $SF_6$ will induce roughness. Likewise, a sputter-etch with argon gas will induce roughness. Also a partial oxidation of the W surface will impart a surface texture by means such as an oxygen plasma or a furnace anneal at temperatures between 500° and 1000° C.

Figures 7, 8:
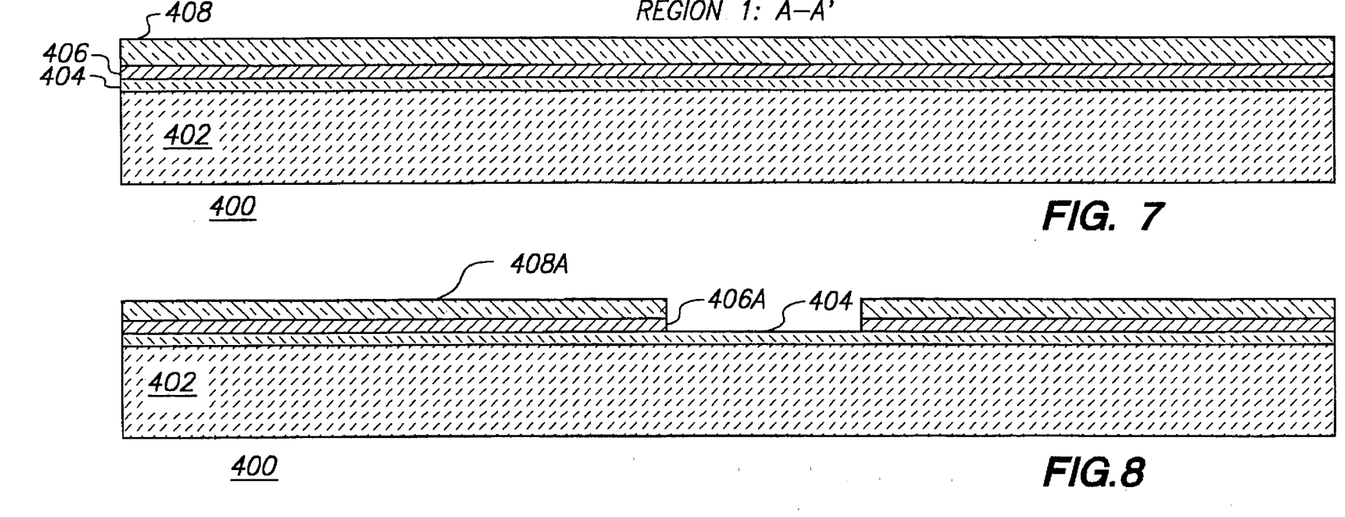

Next, a sacrificial layer 408 is formed over the conducting layer 406. In general, any sacrificial layer 408 that can be etched selectively with respect to the conducting layer 406 and the ribbon layer (not yet formed) may be used. Commonly, a layer of doped glass such as boro-phospho-silicate glass (BPSG) or phospho-silicate glass (PSG) is used. In the preferred embodiment a sacrificial layer 408 of PSG is used. The thickness and tolerance is governed by the electrostatic force required for pixel modulation and contrast ratio, respectively. The criteria for this layer are: i) very high wet etch selectivity (~500:1) relative to overlying silicon nitride ribbons and underlying refractory metal (both exposed during the sacrificial layer etch) and; ii) flowable to a $\leq 45$ degrees angle at ~1200° C. to promote planarization over the first conducting layer. Both etch selectivity and flowability are enhanced by high concentrations of phosphorus doping.

The conducting layer 406 and the sacrificial layer 408 are then photolithographically masked by readily available techniques and then etched sequentially by appropriate dry or wet etch chemistries such the bilayer stack is patterned with a common geometry in a single masking step. The resulting profile from this set of processing steps is shown in FIG. 8.

In the preferred embodiment, the defined PSG/W couple is subjected to a high temperature furnace process such that the PSG is caused to flow and thereby, induce a tapered or chamfered profile in the top corner of the sidewall for the PSG/W bilayer. The profile enhances the sidewall coverage of the subsequent silicon nitride and aluminum layers and imparts mechanical stability by distributing the stress that is induced by bending moments in the silicon nitride ribbons to be formed.

One method to impart a surface texture to the lower electrode after the sacrificial layer has been deposited is to selectively grow a nonuniform oxide, at a microscopic scale. This is accomplished by dopant enhanced oxidation of W in a high temperature annealing step that may optionally be performed before and/or after the bilayer has been patterned. If the anneal is carried out after patterning the bilayer then both the surface texturing and the tapering of the sacrificial layer can be accomplished concomitantly.

Figure 9:
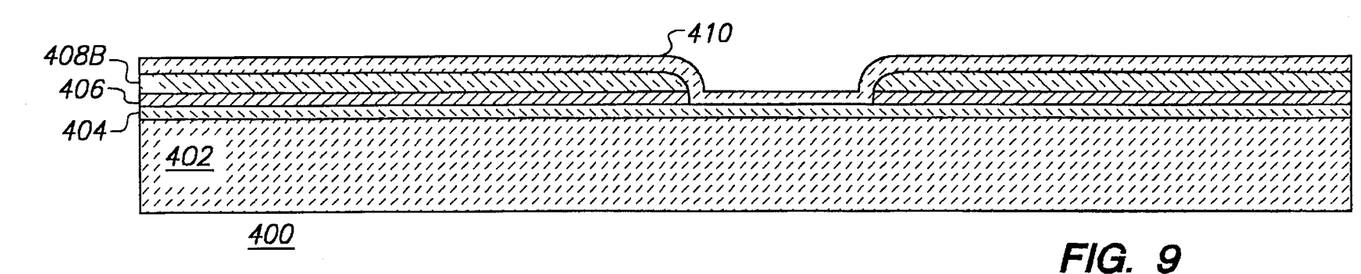

Next, a layer of resilient material 410 is formed over the sacrificial layer 408B as shown in FIG. 9. The preferred material for the resilient material 410 is silicon nitride which is deposited to a thickness and residual stress level that are defined by the spring force necessary for returning the light valve to an up state after a sufficient opposite polarity bias is applied to cancel the electrostatic force induced by the switching bias that brought it to the down state. Silicon nitride can be deposited either by low pressure chemical vapor deposition (LPCVD) or by a plasma enhanced chemical vapor deposition (PECVD). The architecture of the layered structure is now such that the PSG is bounded on three sides (top and sides) by silicon nitride and by W on the bottom. The sidewall of the W is also bounded by silicon nitride. Hence, the PSG/W couple is completely bounded by silicon nitride along dimensions. This is important for two principal reasons: i) the sacrificial layer etch (undercut of defined silicon nitride ribbons), in which the sacrificial PSG is isotropically etched away, is self-limiting by a self-controlled endpoint due to the extremely high selectivity between PSG and silicon nitride, and ii) the sidewall of the silicon nitride ribbon is buttressed by the edge of the W layer which imparts mechanical stability to the silicon nitride light valve by limiting lateral bending moments in the vertical component of the ribbon.

Figure 10:
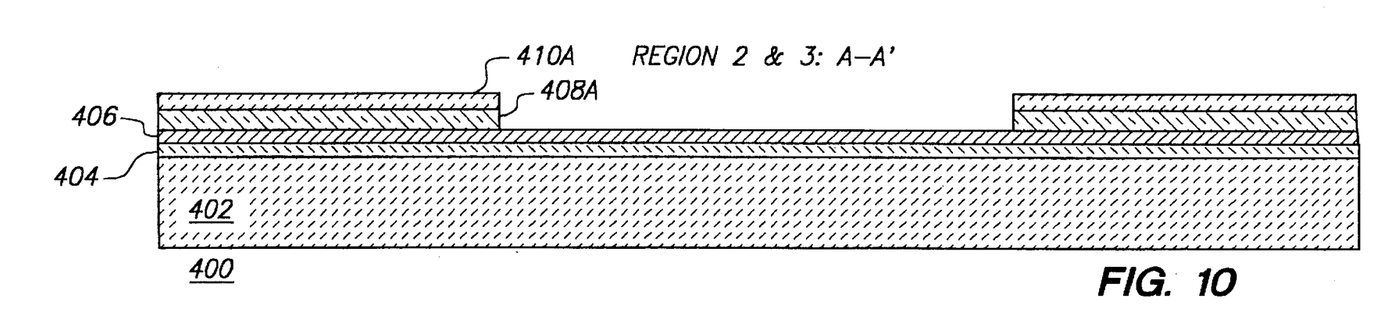

The connection between the ribbons and the bond pads is accomplished by a bus formed of the first conducting layer 406. Holes that define the areas for both bond pads and vias are formed through the resilient material 410A and the sacrificial layer 408A in the periphery of the device outside the region of the pixels as shown in FIG. 10. The conducting layer 406 is exposed through the holes.

Figure 11:
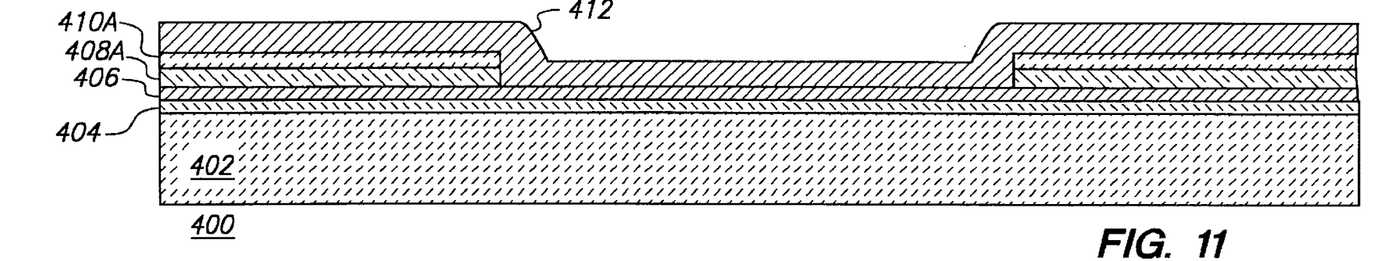

A layer of aluminum 412 is then formed over the structure as shown in FIG. 11 to serve as the bond pad and to fill the contact vias. In the preferred embodiment, this layer of aluminum is deposited to a thickness of $\leq 5000$ Å so that maximum sidewall coverage is achieved in the bond pads and via holes. Conventional methods include a sputter-etch to impose a taper in the nitride top corner prior to an aluminum sputter deposition, hot sputter deposition of the aluminum, eg., at 300° C., biased substrate sputter deposition and/or any combination thereof.

Figure 12:
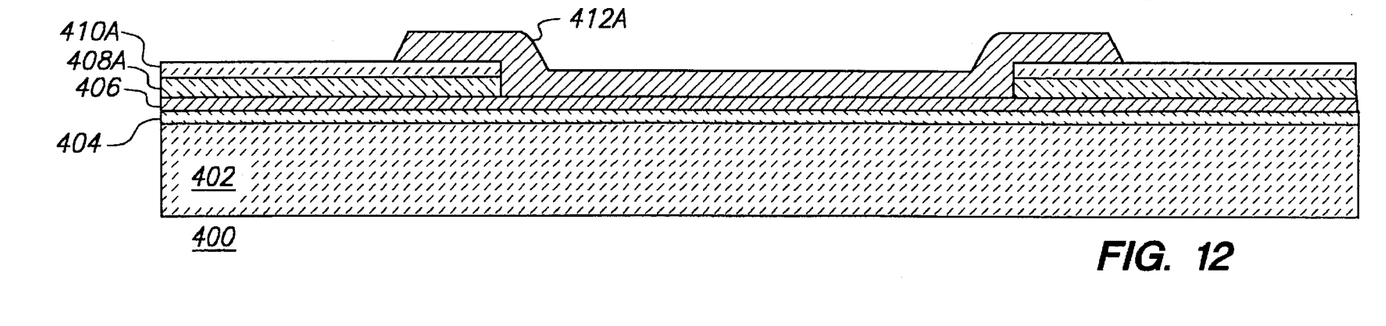

The aluminum layer 412 is then patterned and etched so that it only remains in the bond pad and via regions as illustrated in FIG. 12. As is well known, sufficient overlap is left around the bond pads to avoid forming voids. The sidewall slope of the etched metal at the outside perimeter edge of the overlap is very important insofar as assuring maximum step coverage and, thereby, continuity of the subsequently deposited thin aluminum upper electrode of the ribbon grating. A sloped etch profile in the aluminum layer 412 is formed by a controlled wet etching process.

Figure 25:
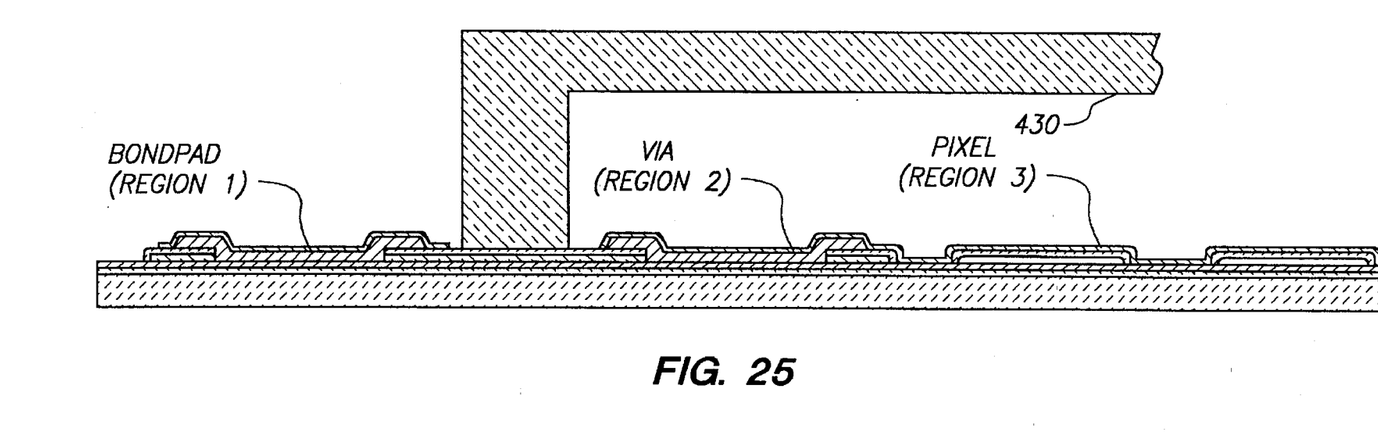

In the preferred embodiment the conducting layer 406A is buried beneath PSG and ribbon silicon nitride and a defined area above the bus layer extending from the inside edge of the bond pads to the outside edge of the grating array. This passivated region is shown between the bond pad 306 and the via 320. A glass lid is mounted to this passivated region to hermetically seal the pixel area of the device from environmental conditions. The bond pads remain outside the seal established by the lid as shown in FIG. 25. Only the vias and pixel region are covered by the lid. The lid is attached to the device after the final step of the process in completed.

Figure 13:
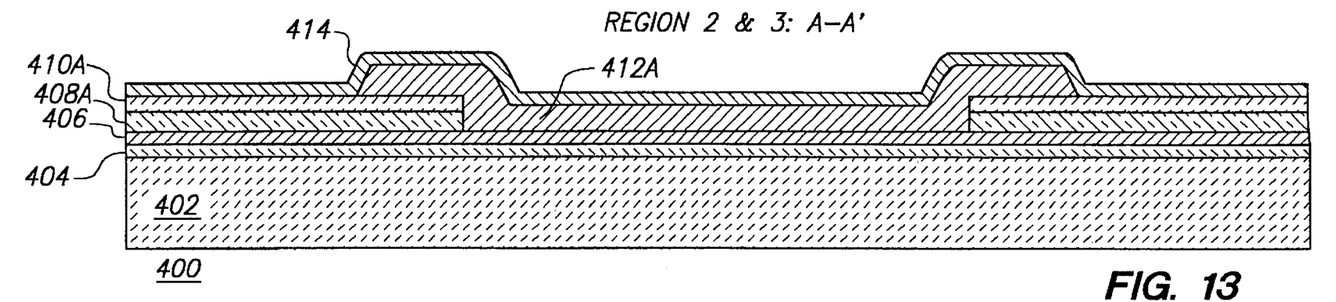
Figure 14:
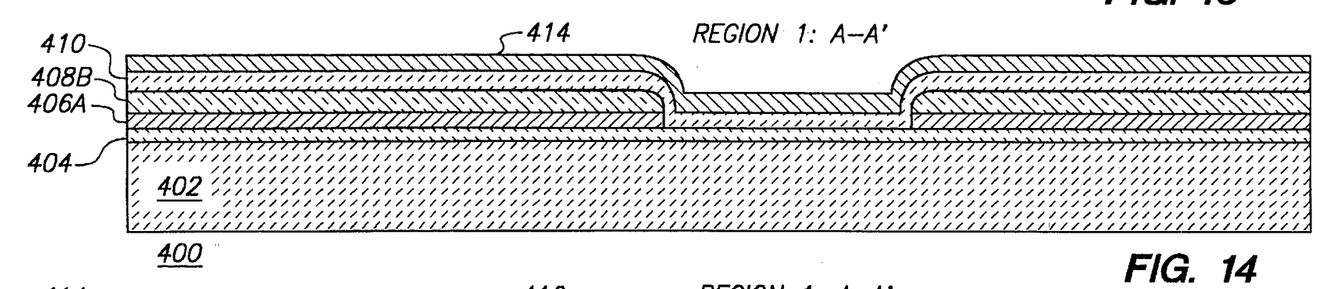

Next, as shown in FIG. 13 and 14, a thin aluminum layer 414 is deposited over the device. This layer 414 provides enhanced reflectivity to the pixel ribbons (to be formed). The aluminum layer 414 is deposited to a thickness of $\leq 1000$ Å.

Figure 15:
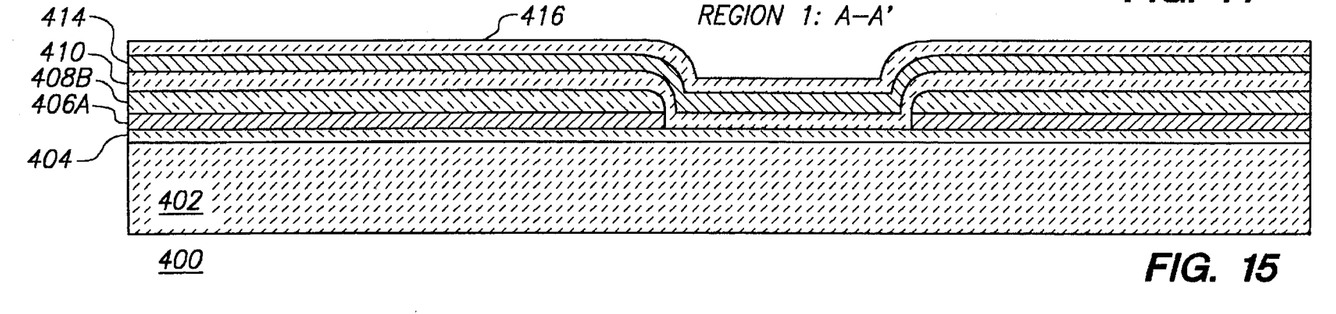
Figures 16, 17:
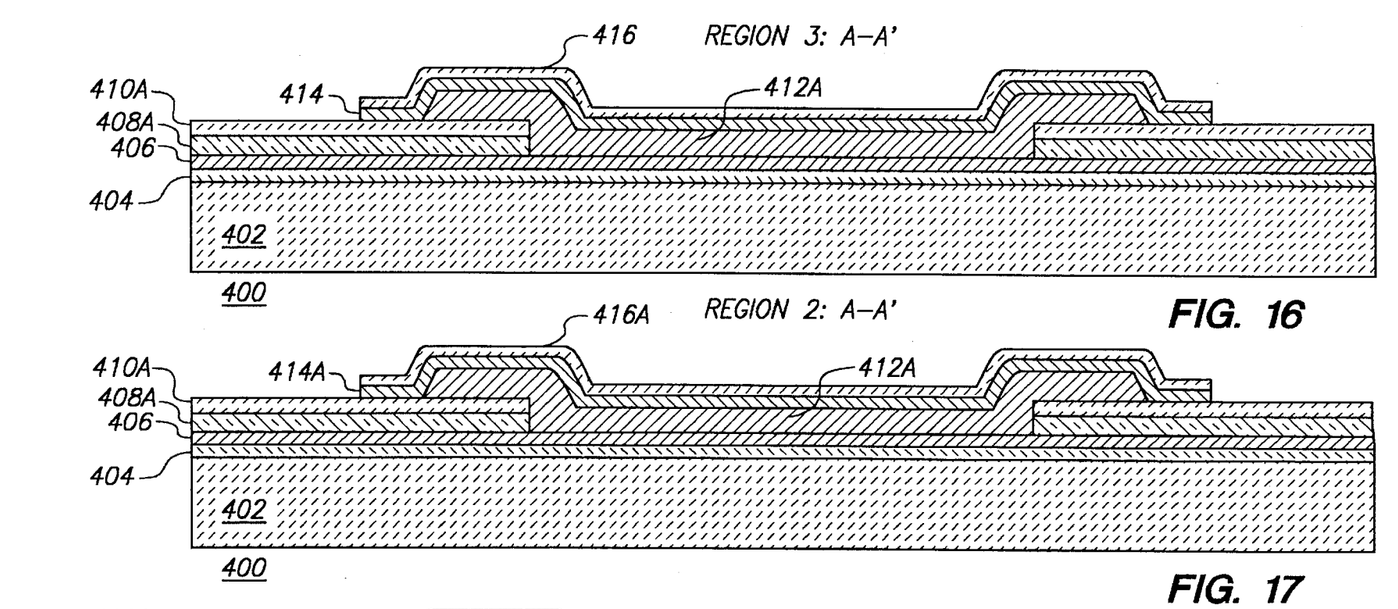
Figure 18:
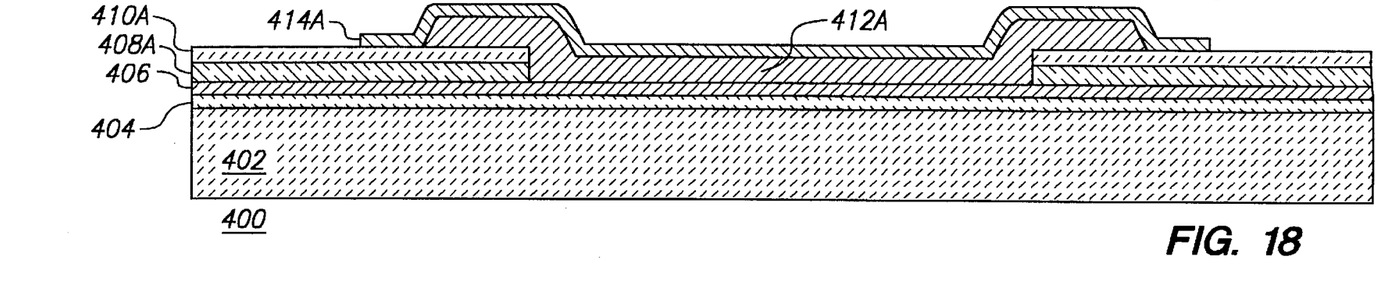

A thin dielectric layer 416 of silicon dioxide is formed over the thin aluminum layer 414 as shown in FIG. 15 for the pixel region and in FIGS. 16 and 17 for the periphery. The dielectric layer is $\leq 500$ Å thick. The dielectric layer 416 and the thin aluminum layer 414 are patterned and etched in the periphery as shown in FIGS. 16 and 17. The dielectric layer 416A is removed from the bond pads as shown in FIG. 18 to provide a conductive surface for bonding. The thin dielectric layer 416 performs two primary functions. First, it provides a protective layer for the thin aluminum layer 414 during subsequent processing steps, such as stripping photoresist. Second, it helps to suppress electromigration of the thin aluminum layer 414 and mechanical strain during operation of the light modulator.

Figure 19:
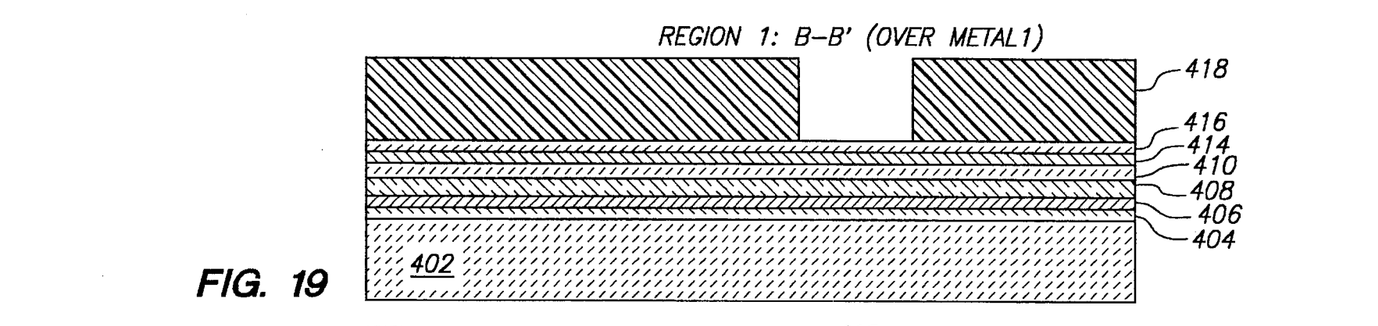
Figure 20:
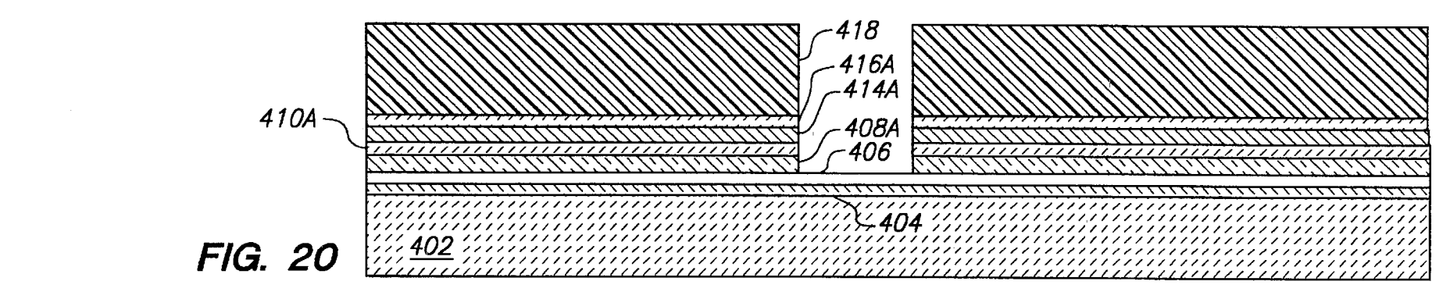
Figure 21:
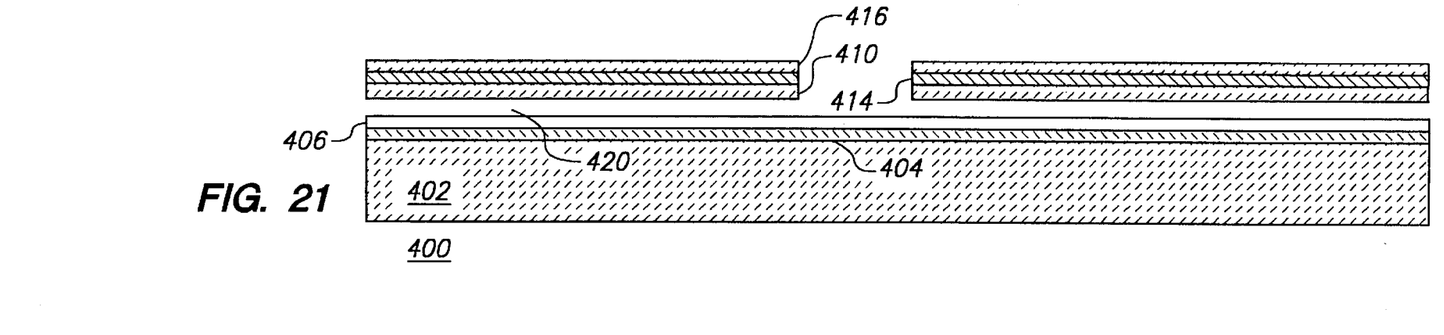

Next, the pixel area is conditioned to form the ribbons of the diffraction grating. Note that the next sequence of cross sections are made perpendicularly to those shown previously. There are two possible processes for forming these ribbons. The first such process is shown in FIGS. 19 through 21. In FIG. 19 an opening is formed through a photoresist layer 418. The thin dielectric layer 416, the thin aluminum layer 414, the resilient layer 410 and the sacrificial layer 408 are all etched using the photoresist layer 418 as a mask as shown in FIG. 20. FIG. 21 shows that the sacrificial layer 408A is completely removed. The ribbon structure includes the thin dielectric layer 416, the thin aluminum layer 414 and the resilient layer 410. From the vantage of this cross section, it appears that the ribbon structure is floating in air. In fact, the ribbon structure is suspended over an air gap 420 above the conducting layer 406 by its ends as will be shown in FIG. 26.

Figure 22:
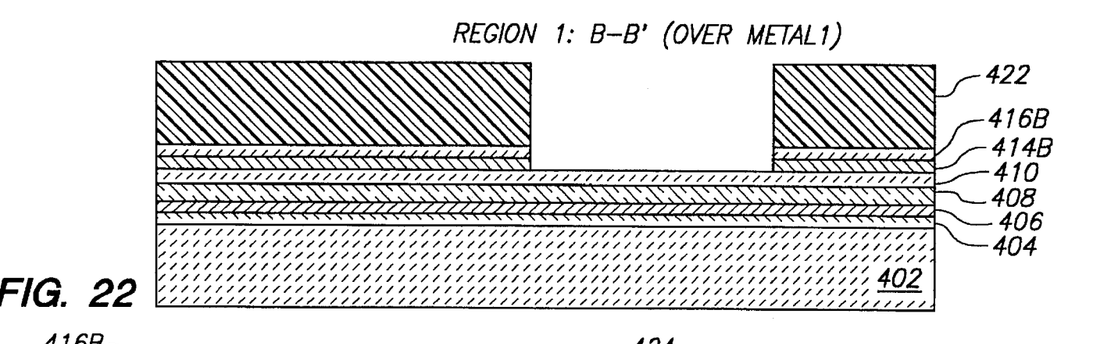
Figure 23:
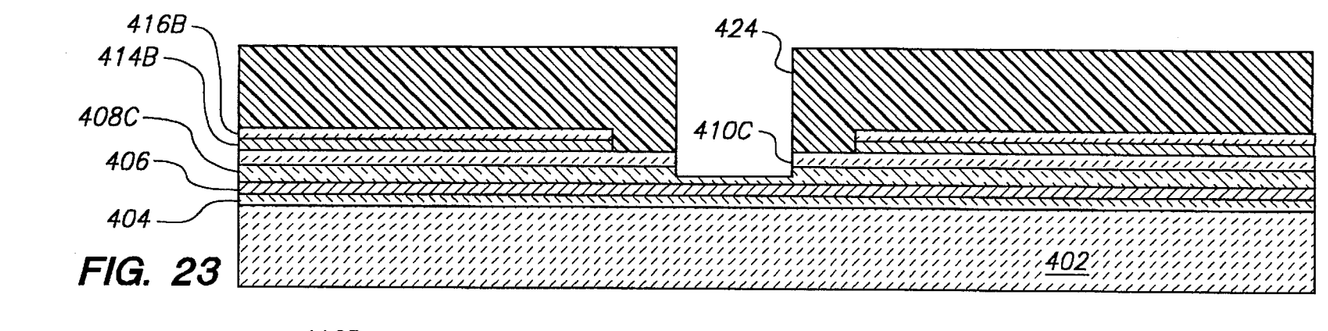
Figure 24:
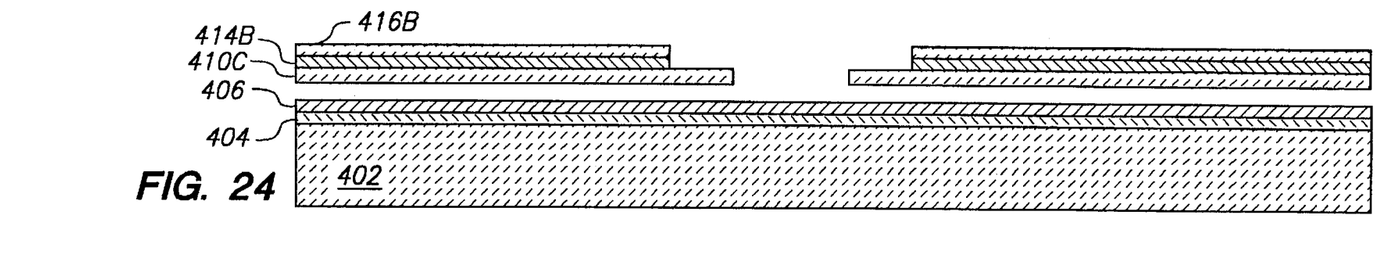

The second process for defining the ribbons is shown in FIGS. 22 through 24. In FIG. 22 an opening is formed in a photoresist layer 422 which in turn is used as an etch mask to remove portions of the thin dielectric layer 416B and the thin aluminum layer 414B. The photoresist layer 422 is removed and a second photoresist layer 424 is put down and masked. The photoresist 424 is used as an etch mask for the layers 410C and 408C. The sacrificial layer 408C need not be entirely removed as a result of the masking step because next the entire sacrificial layer 408 is removed. As in the process described above, the ribbon is suspended above the conducting layer 406.

As a final step to either process, a lid 430 is mounted over the pixel area and the vias. The lid contacts the structure of the device in the region between the vias and the bond pads so that the bond pads are external to the lid of the package as shown in FIG. 25.

Figure 26:
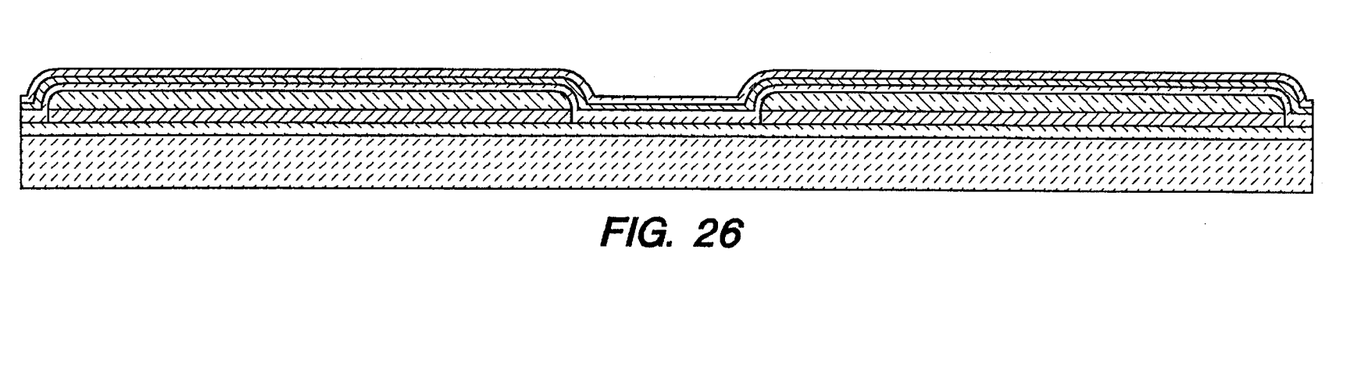

FIG. 26 shows a cross section view of two completed ribbons showing the length of the ribbons and the structure for mounting the ribbons to the substrate.

The present invention has been described relative to a preferred embodiment. Improvements or modifications that become apparent to persons of ordinary skill in the art only after reading this disclosure are deemed within the spirit and scope of the application.

We claim:

1. A method of forming a light modulator on a substrate comprising the steps of:
   a. forming a sacrificial layer on the substrate, such that the substrate is exposed in at least two locations which are separated by the sacrificial layer;
   b. forming at least two separate ribbon structures over the sacrificial layer and coupled to the substrate at the two locations, each ribbon structure having a reflective surface; and
   c. removing the sacrificial layer.

2. The method according to claim 1 wherein the substrate includes an insulating layer.

3. The method according to claim 2 wherein the sacrificial layer is deposited.

4. The method according to claim 2 wherein the sacrificial layer is a selectively etched material.

5. The method according to claim 2 wherein the sacrificial layer is phosphosilicate glass.

6. A method of forming a reflection phase grating light modulator on a substrate comprising the steps of:

a. forming a sacrificial layer on the substrate;

b. forming a reflective structure anchored to the substrate;

c. selectively removing portions of the reflective structure to provide a plurality of ribbons such that each ribbon is selectively moveable relative to its adjacent neighbor; and d. removing the sacrificial layer.

7. The method according to claim 6 wherein the substrate includes an insulating layer.

8. The method according to claim 7 wherein the sacrificial layer is deposited.

9. The method according to claim 7 wherein the sacrificial layer is a selectively etched material.

10. The method according to claim 7 wherein the sacrificial layer is phosphosilicate glass.

11. A method of manufacturing a modulator for modulating light, comprising the steps of:

a. providing a substrate;

b. forming an insulating layer on the substrate;

c. forming a first conducting layer on the insulating layer;

d. forming a sacrificial layer onto the first conducting layer;

e. etching the sacrificial layer and the first conducting layer to define both bit lines and busses to bonding pads thereby forming etched layers;

f. forming a layer of resilient material onto the etched layers;

g. forming a reflective conducting layer on the resilient material layer;

h. etching the reflective conducting layer, resilient layer, and sacrificial layer to form a grating including a plurality of parallel elements; and i. removing the sacrificial layer below the parallel elements, whereby the parallel elements are suspended over the first conducting layer.

12. The method of manufacturing according to claim 11 further comprising a step of preventing the grating from sticking to the first conducting layer when the grating is moved towards the first conducting layer.

13. The method of manufacturing according to claim 11 further comprising a step of depositing a dielectric layer on the reflective conducting layer.

14. The method of manufacturing according to claim 12 wherein the step of preventing the grating from sticking to the first conducting layer is performed by providing a treated surface between the grating and the first conducting layer.

15. The method according to claim 11 further comprising a step of mounting a lid to the substrate such that the bonding pads are exposed and the ribbons are under the lid.

16. A light modulator comprising:

e. a substrate;

f. an insulating layer on the substrate;

g. a plurality of conductive lines on the substrate; and h. at least two adjacent ribbons formed over the conductive lines and separated from the conductive lines by an air space wherein each ribbon includes a reflective layer which is also a conducting layer such that adjacent ribbons include adjacent reflective layers; and i. means for non-rotationally moving two adjacent ribbons relative to one another to form a diffraction grating.

17. A light modulator comprising:

a. a substrate;

b. an insulating layer on the substrate;

c. a plurality of parallel conductive layers formed on the insulating layer such that adjacent ones of the conductive layers are separated by a gap;

d. a plurality of continuous parallel reflective ribbons oriented substantially perpendicular to the conductive layers, such that the ribbons are spaced apart from the conductive layers by an air space and mounted to the substrate in the gaps between the conductive layers.

18. The light modulator according to claim 17 wherein the ribbons extend substantially perpendicularly up from the substrate and bend through an arc over the conducting layers.

* * * * *

UNITED STATES PATENT AND TRADEMARK OFFICE
CERTIFICATE OF CORRECTION

PATENT NO.  : 5,661,592

DATED       : 8/26/97

INVENTOR(S) : Jonathan G. Bornstein et al.

It is certified that error appears in the above-identified patent and that said Letters Patent is hereby correct as shown below:

In the entire specification, delete the symbol "$\underline{\leq}$" and insert --$\leq$--.

In column 7, line 5, delete "along dimensions." and insert --along two dimensions.--.

In column 10, line 35, delete " through an are over" and insert --through an arc over--.

Signed and Sealed this

Sixteenth Day of December, 1997

Attest:

BRUCE LEHMAN

*Attesting Officer*  *Commissioner of Patents and Trademarks*